United States Patent [19]

Bath et al.

[11] 3,808,017

[45] Apr. 30, 1974

[54] DRY POWDER ADHESIVE COMPOSITIONS

[75] Inventors: Wesley W. Bath, Williamsville; George H. Harlock, East Amherst; William B. Forte, Williamsville, all of N.Y.

[73] Assignee: National Gypsum Company, Buffalo, N.Y.

[22] Filed: Feb. 6, 1969

[21] Appl. No.: 797,275

[52] U.S. Cl. .............................................. 106/214
[51] Int. Cl. .............................................. C08b 27/02
[58] Field of Search .......................... 106/214; 260/8

[56] References Cited

UNITED STATES PATENTS

| | | | |
|---|---|---|---|
| 3,501,424 | 3/1970 | Imoto et al. | 106/214 |
| 3,411,926 | 11/1968 | Gogek | 106/214 |
| 3,303,147 | 2/1967 | Elden | 260/8 |
| 3,297,601 | 1/1967 | Maynard | 260/8 |
| 3,279,934 | 10/1966 | Schuppner | 106/214 |
| 3,126,355 | 3/1964 | Birten | 260/30.6 |

*Primary Examiner*—Theodore Morris
*Attorney, Agent, or Firm*—Robert F. Hause

[57] ABSTRACT

Dry powder adhesive compositions suitable for admixture with water and having a novel binder system consisting of binder material and a surface active agent, the binder material consisting of dry powder pregelled modified starch. Dry powder joint compounds for gypsum wallboard having such a binder system.

5 Claims, No Drawings

DRY POWDER ADHESIVE COMPOSITIONS

BACKGROUND OF THE INVENTION

The use of gypsum wallboard to form wall surfaces in residential and commercial building construction has achieved widespread popularity throughout the construction industry. The many advantages of using wallboard for this purpose have been well documented in the prior literature. In the process of constructing wall surfaces from this material considerations are present which are peculiar to its use, one of these being that to form with wallboard, a finished wall surface having a smooth, monolithic appearance it is necessary to conceal the joints formed between abutting sections of the wallboard. It has been the usual industry practice to conceal these joints by covering them with a strip of paper joint tape. A common method of applying the tape to a joint is to embed the tape in an adhesive, commonly known as a joint compound, which serves to adhere the tape to the wallboard. Additional layers of the joint compound may then be applied to completely conceal the tape. Subsequently, when the adhesive composition has dried, it is sanded to a smooth finish. In this manner an overall wall surface is formed which, when covered with paint or the like, will present an attractive monolithic appearance.

Generally these joint compounds consist of binder material and suitable inorganic mineral fillers. In the past proteins such as casein and soya proteins were commonly used as binders for these adhesive compositions. These binder materials were not completely satisfactory however, for some of the protein-bound adhesives were particularly susceptible to edge-cracking, i.e., development of cracks at or near the edges of the joint tape. This characteristic can destroy the monolithic appearance of the wall surface, thus necessitating delays in construction and/or costly repairs. Furthermore the proteins experience a viscosity drop upon standing which limits the period over which joint compounds having them as binders can be stored prior to use. Consequently, attempts have been made to discover new binders for these joint compounds.

Various types of starch have been investigated to determine their suitability for this purpose since they are available in abundant quantities and are relatively inexpensive. However, past attempts to incorporate starches into joint compounds as the only or major binder component have not met with complete success. The primary obstacle to the use of starches has been the problem of achieving a proper balance for the adhesive among properties such as the degree of shrinkage upon drying, ease of sanding after drying, ease of application, bonding strength and resistance to cracking. Starches exhibit a tendency to migrate to the surface of a layer of the joint compound as the water evaporates during the drying period. The starches which have the best resistance to this migration phenomenon and the best bonding properties are those having relatively high molecular weights. They also have relatively high viscosities in water solutions and are excessively cohesive. Joint compounds containing such starches, in amounts sufficient to give good bonding properties when they are the only or primary binder component of the composition, must be reduced with relatively large volumes of water in order to form a paste-like aqueous mixture of workable consistency. The degree of shrinkage under these conditions is much greater than that which is considered to be acceptable and the paste-like mixture is difficult to apply due to the stickiness of the starch. Moreover, such adhesive compositions are susceptible to cracking. Those joint compounds having lower molecular weight starches as their binder require lesser volumes of water for reduction to a workable consistency and thus exhibit an acceptable degree of shrinkage. These joint compounds are easier to apply than is the case with those described above since the starches become less cohesive as their molecular weight decreases. However, as their molecular weights decrease the starches become more susceptible to a migration phenomenon which in turn causes their bonding properties to be diminished. The migration of the starch, if not controlled by some means, will result in a hard surface which is difficult to sand and, in extreme situations, can cause a loss of bond with the substrate. Excessive starch migration can also cause a dark surface coloration which is undesirable when these compositions are utilized in applications where they are not covered with paint or the like after being applied such as when they are used as roll or spray textures.

SUMMARY OF THE INVENTION

It is an object of this invention to provide improved dry powder adhesive compositions which are suitable for admixture with water. It is another object to provide such adhesive compositions in which the binder consists of modified starch.

It is yet another object to provide joint compounds for adhering joint tape to gypsum wallboard. It is a further object to provide joint compounds having binder material as described above. Still further it is an object to provide such joint compounds in which the binder will remain dispersed substantially throughout the joint compound after it has been applied to the wallboard and allowed to dry. It is still another object to provide such joint compounds for which a proper balance may be realized among such properties as ease of application, degree of shrinkage upon drying, bonding strength, ease of sanding and resistance to cracking.

Briefly stated, the present invention resides in the discovery that the tendency of the starch to migrate to the surface of a layer of adhesive as it is drying after having been applied to a surface can be effectively controlled by the addition of a suitable surface active agent to the adhesive composition. By substantially controlling the migration of the modified starches which can be used as binders according to the practice of this invention it is possible to use greater percentages of starch than was heretofore the case and yet continue to achieve a proper balance among the physical and working properties of the adhesive composition. The surface active agent keeps the modified starch dispersed substantially throughout the layer of adhesive thus preventing excessive surface hardening and assuring a good bond with the substrate. The use of the surface active agent also greatly improves the resistance of the adhesive to cracking. This novel binder system has been found to give excellent performance when used in joint compounds for gypsum wallboard. These and other objects of the invention will become readily apparent when considered in relation to the preferred embodiments as set forth in the specification.

This new binder system is applicable for use with any dry powder adhesive consisting essentially of a binder together with a suitable mixture of inorganic mineral fillers and for which water is the primary diluent in the preparation of the adhesive for end use. Such compositions may be used, for example, as spackles, roll and spray textures, laminating adhesive, joint compounds for gypsum wallboard and the like. They are applied to surfaces in layers having typical thicknesses of from about 0.040 to about ⅜ inch or more. Their preferred use is as joint compounds for gypsum wallboard and the invention will therefore be described in detail with respect to this application.

The inorganic mineral fillers most commonly used in joint compounds are limestone, mica, talc, asbestos and the like. In addition to their function as fillers they can also contribute to the properties of the composition. For example, mica helps to improve the crack resistance of the composition and the asbestos provides some control over the amount of slip or pull experienced when applying the paste-like mixture formed when the joint compound is admixed with water. The relative percentages of the various fillers can therefore be varied widely to help provide the desired combination of properties. A thickener is also added to the composition to provide body to the paste-like aqueous mixture. By functioning as water retentative aids, thickeners such as hydroxyethyl cellulose, methyl cellulose, natural gums, alginates or the like provide improved workability for the mixture particularly in what are known as the wet edge working properties. Preservatives such as tin or mercury compounds and the like are also added to prevent the binder from deteriorating rapidly after the aqueous mixture is formed. These additives allow the mixture to be usable over a longer period of time than would otherwise be the case.

The binders which can be utilized in joint compounds according to the practice of this invention may consist of modified starch.

Typical formulations for joint compounds prepared according to this invention will be generally within the following ranges of ingredients:

TABLE 1

| | % BY WEIGHT OF JOINT COMPOUND |
|---|---|
| Binder | 3–10 |
| Surface Active Agent | 0.3–1.5 |
| Thickener | 0.1–0.5 |
| Preservative | 0.1–0.5 |
| Fillers | 87.5–96.5 |

The surface active agent chosen for addition to a joint compound composition to accomplish the objects of this invention must be selected according to the characteristics of the modified starch which is present in the formulation. All of the available surface active agents do not effect the desired results with each modified starch compound which is suitable for use as a binder. Thus, a surface active agent which is suitable to control the migration of the modified starch present must be found through a process of experimentation. It has been found, as will be illustrated further below, that more than one chemical type of surface active agent can be suitable for a given formulation. The effectiveness of the compounds found to be suitable may vary by degree, i.e., they may control the migration of the modified starch within limits which are found to be acceptable.

In view of the numerous surface active agents and modified starch compounds available, and the many different types of each, the preferred embodiment of the invention will not be described in terms of the specific types of each which can be combined effectively to carry out the objects of this invention but rather in terms of the results obtained when the joint compound is tested according to a specified test procedure. This test, referred to hereinafter as the "Ease of Sanding Test" is carried out in the following manner:

The contents of the joint compound composition are thoroughly blended together such as by mixing them in a Patterson-Kelly twin shell mixer and then reduced with a volume of water to a consistency which allows the mixture to be spread easily. For example, 100 parts by weight of the composition can be added to about 70 parts by weight of water to form a paste-like mixture. A strip of ⅜ inch gypsum wallboard measuring 24 × 8 inches is laid flat and two plastic or metal shims, 24 inches in length with a thickness of 0.045 inch, are aligned on the wallboard parallel and spaced exactly 4 inches apart. The aqueous joint compound mixture is placed on the wallboard between the shims and spread smoothly between and level with the surfaces of the shims by means of a 5 inch wide rigidized broad knife. Thus, the thickness of the layer of joint cement is 0.045 inch. The wallboard is placed in an oven, such as a laboratory circulating air oven, at a temperature of 110°F and a relative humidity of 30 percent where it is allowed to remain for 4 hours. Upon expiration of this time period the wallboard is removed from the oven, cut into 4 inch squares and a ¼ inch diameter hole is drilled in the center of each square. The squares are then placed in the oven at the same above-described conditions and allowed to remain therein until they are to be tested.

When a total of 24 hours have elapsed from the time the specimens were made, the test specimens are removed from the oven and tested on a Tabar Abraser (Research Model) having a vacuum attachment. This apparatus is commercially available from the Taber Instrument Corp., North Tonawanda, New York. A strip of 180 grit sandpaper is attached to each of the two rubber abrading wheels. The sandpaper strips must be the same width as the wheels and attached without overlapping on either side of the wheels. The test specimen is placed on its holder and weighed to the nearest centigram. The holder is then attached to the apparatus and the abrading wheels are lowered onto the test specimen. The vacuum attachment is positioned with its air inlet at a distance of 10 ± 1 mils above the surface of the specimen. The vacuum and the apparatus are then started in that order. The apparatus is allowed to make 25 revolutions and then stopped. Before the vacuum is turned off the specimen must be allowed to come to a stop. The surface of the specimen is then brushed lightly with a soft brush in order to remove any loose particles which have not been picked up by the vacuum thereby assuring an accurate result. The test specimen in its holder is then reweighed to the nearest centigram. The average of two specimens is taken as the final result.

In the preferred embodiment of the invention the starch migration is controlled to a degree such that, 24 hours after preparation of the test specimen, the weight loss exhibited during 25 cycles of sanding is in the range of from 0.25 to 0.45 gram. Since the surface hardness of the layer of joint compound is directly related to the degree of starch migration the weight loss reflects the effectiveness of the surface active agent.

Starches in their native form have relatively high molecular weights which make them unsuitable as binders for the reasons previously discussed. It is therefore necessary to modify these starches in order to effect a reduction in their molecular weights. This modification may be effected by various processes including oxidation, acid hydrolysis and enzyme conversion. Modified starches which have a viscosity of from about 50 to about 150 centipoises when tested in the form of 15 percent aqueous slurries at a temperature of 100°F are preferred. Prior to being incorporated in the adhesive compositions as binders the modified starches must be further processed to make them substantially soluble in cold water since they generally do not possess this characteristic. This can be done by pre-gelatinizing the modified starch by means of a cooking process and then drum or spray drying it. A starch which is from about 65 to about 95 percent soluble in cold water is satisfactory.

The invention may be practiced with a single pre-gelled, modified starch comprising the total starch content of the composition or by using two or more of these compounds together in a formulation. The latter procedure is preferred since it allows greater variability among the different properties of the joint compound. As was noted previously, the higher molecular weight starches have better bonding properties than those having lower molecular weights but are more cohesive and have higher viscosities in water solutions. By combining pre-gelled, modified starches of different molecular weights while varying the total starch content within the specified percentages, it is possible to obtain excellent performance with respect to all of the properties of the composition.

The surface active agents which are added to the adhesive compositions to control the migration of the starch may be powders, liquids or combinations thereof. They are preferably added in an amount equal to from about 10 to about 15 percent by weight of the total binder content of the composition. They can be incorporated into the formulation by various methods. A dry powder type is merely added to the other components of the formulation and thoroughly dispersed throughout the mixture during the blending process. Liquid types can be sprayed on the other compounds as they are being blended together; or they may be sprayed on one of the more absorbent compounds of the composition which is then blended in with the remainder of the formulation. Another method would be to mix the surface active agent with the modified starch prior to subjecting the latter to the pre-gelatinization process.

The invention will now be further described with reference to specific examples which are intended to be illustrative only, it being understood that the invention is not limited to the materials or amounts specified therein. All materials shown are in parts by weight.

EXAMPLE I

Dry powder adhesive compositions were prepared in the following manner using the materials listed below in the amounts indicated.

| MATERIALS | A | B | C | D | E |
|---|---|---|---|---|---|
| Limestone | 1000.0 | 1000.0 | 1000.0 | 1000.0 | 1000.0 |
| Talc | 500.0 | 500.0 | 500.0 | 500.0 | 500.0 |
| Mica | 400.0 | 400.0 | 400.0 | 400.0 | 400.0 |
| Asbestos | 40.0 | 40.0 | 40.0 | 40.0 | 40.0 |
| A-B 2030* | 80.0 | 80.0 | 80.0 | 80.0 | 80.0 |
| S 330* | 55.0 | 55.0 | 55.0 | 55.0 | 55.0 |
| Preservative | 1.5 | 1.5 | 1.5 | 1.5 | 1.5 |
| Thickener | 1.5 | 1.5 | 1.5 | 1.5 | 1.5 |
| Surface Active Agent** | — | 5.0 | 10.0 | 15.0 | 20.0 |

* A-B 2030 is a modified starch which is a product of the Anheuser-Busch Company. The S 330 is a modified starch made by the A. E. Staley Company.
** The surface active agent used was Renex-25 which consists of polyoxyethylene esters of mixed fatty and resin esters complexed with urea. It is commercially available in the form of a white powder from Atlas Chemical Industries.

The materials were blended together in a Patterson-Kelly twin shell mixer to form a uniform mixture. One hundred parts of the composition were then thoroughly mixed with water in the amounts shown in Table 2 to form a paste-like mixture having a viscosity as shown. Each composition was then tested according to the Ease of Sanding Test. The results are listed in Table 2 wherein the amounts listed are in parts by weight except where otherwise designated.

TABLE 2

| | A | B | C | D | E |
|---|---|---|---|---|---|
| Adhesive | 100.0 | 100.0 | 100.0 | 100.0 | 100.0 |
| Water | 70.0 | 68.0 | 67.5 | 66.0 | 65.0 |
| Viscosity (Brabender Units) | 480 | 510 | 480 | 470 | 540 |
| Weight Loss 25 Cycles Sanding (Grams × $10^{-2}$) | 12 | 19 | 26 | 41 | 50 |

The control of the starch migration by the surface active agent is evident from the results obtained. Sample A, containing no surface active agent, exhibited a hard surface indicating excessive starch migration to the surface of the layer of joint compound. Sample B, containing about 0.25 percent of surface active agent showed a noticeable improvement indicating that the surface active agent had exerted considerable control over the starch migration. Samples C and D, containing about 0.5 and 0.7 percent of surface active agent respectively, are illustrative of the best mode of practicing the invention wherein the starch migration is controlled to a degree whereby the weight loss obtained from the Ease of Sanding Test is in the range of from 0.25 to 0.45 gram.

The improvement in the crack resistance properties of the compositions due to the surface active agent was evident from visual observation of the test specimens. Sample A exhibited a considerable degree of cracking whereas the others exhibited good crack resistance characteristics.

EXAMPLE II

Dry Powder adhesive compositions were prepared using the materials listed below in the amounts indicated:

| MATERIALS | A | B |
|---|---|---|
| Limestone | 1000.0 | 1000.0 |
| Talc | 500.0 | 500.0 |
| Mica | 400.0 | 400.0 |
| Asbestos | 40.0 | 40.0 |
| Preservative | 1.5 | 1.5 |
| Thickener | 1.5 | 1.5 |
| A-B 2030 | 80.0 | 80.0 |
| S 330 | 55.0 | 55.0 |
| Tween-20* | 10.0 | — |
| Tween-60* | — | 10.0 |

*Tween-20, a polyoxyethylene sorbitan monolaurate surface active agent, is commercially available in liquid from Atlas Chemical Industries. Tween-60, a polyoxyethylene sorbitan stearate surface active agent is also available in liquid form from the same company.

The compositions were blended together and mixed with water in the manner previously described in Example II. The results obtained from the Ease of Sanding Test are shown in Table 3.

TABLE 3

| | A | B |
|---|---|---|
| Adhesive | 100.0 | 100.0 |
| Water | 65.0 | 65.0 |
| Viscosity (Brabender Units) | 440 | 440 |
| Weight Loss 25 Sanding Cycles (Grams × $10^{-2}$) | 41 | 40 |

Having given a detailed disclosure of the preferred embodiments of our invention so that those skilled in the art may practice the same, we contemplate that variations may be made without departing from the essence of the invention or the scope of the claims.

What we claim is:

1. In the application of coating a dry starch powder, inert filler and water combination to a wall surface, the method of maintaining an homogeneous coating throughout the drying thereof, comprising the steps of thoroughly mixing from about 0.3 to about 1.5 percent by weight of a polyoxyethylene ester surface active agent, from about 3 to about 10 percent by weight of a binder, said binder consisting of starch a substantial proportion of which is dry powder pre-gelled modified starch, from about 88 to about 96 percent by weight of inert, inorganic finely-divided fillers and sufficient water to form a workable paste-like consistency, applying a layer of about 0.040 to about 0.375 inch thickness of said paste-like aqueous mixture to a wall surface, drying said layer by migration of the contained water to the layer surface remote from said wall surface, said migration of water carrying substantially no dissolved starch therein, said water evaporating therefrom at said layer surface remote from said wall surface, whereby the dried layer resulting therefrom contains said pre-gelled modified starch dispersed substantially uniformly throughout said layer.

2. The method of securing joint tape to a joint defined by abutting sections of gypsum wallboard comprising the steps of thoroughly mixing from about 0.3 to about 1.5 percent by weight of a polyoxyethylene ester surface active agent, from about 3 to about 10 percent by weight of a binder, said binder consisting of starch a substantial proportion of which is dry powder pre-gelled modified starch, from about 88 to about 96 percent by weight of inert, inorganic finely-divided fillers and sufficient water to form a workable paste-like consistency, applying the said paste-like aqueous mixture to the joint defined by abutting sections of the wallboard, embedding a strip of joint tape in the said aqueous mixture while it is still wet, forming a layer having a substantially flat visible surface from the aqueous mixture with suitable spreading means, allowing said layer to dry by migration of the contained water to the layer surface remote from the surface of said wallboard and evaporation of said water therefrom, applying at least one additional layer of said aqueous mixture over the first layer in the same manner, allowing such additional layer to dry in the same manner before disposing another layer over it, whereby a smooth integral dry layer having a substantially flat visible surface is formed completely concealing said joint tape, said integral dry layer containing said pre-gelled modified starch dispersed substantially uniformly throughout said integral layer.

3. The method of forming a textured wall surface comprising the steps of thoroughly mixing from about 0.3 to about 1.5 percent by weight of a polyoxyethylene ester surface active agent, from about 3 to about 10 percent by weight of a binder, said binder consisting of starch a substantial proportion of which is dry powder pre-gelled modified starch, from about 88 to about 96 percent by weight of inert, inorganic finely divided fillers and sufficient water to form a workable paste-like consistency, applying a layer of said paste-like aqueous mixture to a wall surface with suitable applying means so as to completely cover said wall surface, allowing said layer of aqueous mixture to dry by migration of the contained water to the surface of said layer remote from said wall surface and evaporation of said water from said surface of said layer whereby the dried layer resulting therefrom contains said pre-gelled modified starch dispersed substantially uniformly throughout said layer.

4. A dry powder adhesive composition suitable for admixture with water comprising from about 0.3 to about 1.5 percent by weight of a polyoxyethylene ester surface active agent, from about 3 to about 10 percent by weight of a binder, said binder consisting of starch a substantial proportion of which is dry powder pregelled modified starch, and from about 88 to about 96 percent by weight of inert, inorganic, finely divided fillers, said surface active agent providing properties which will keep the said pre-gelled modified starch binder dispersed substantially uniformly throughout a dry layer of said adhesive composition, said dry layer having been formed by admixing the said adhesive composition with sufficient water to form a paste-like mixture of workable consistency, applying a layer of said paste-like aqueous mixture to a wall surface and allowing it to dry by migration of the contained water to the surface of said layer remote from said wall surface with said water evaporating from said surface of said layer.

5. The dry powder adhesive composition as defined in claim 4 which exhibits a weight loss of from 0.25 to 0.45 gram when tested for 25 cycles of sanding according to the Ease of Sanding Test disclosed herein.

* * * * *